(12) United States Patent
Johnson

(10) Patent No.: US 6,171,354 B1
(45) Date of Patent: Jan. 9, 2001

(54) SELF-ADHESIVE AIR FILTER FOR FORCED AIR CLIMATE CONTROL SYSTEM

(75) Inventor: Marilyn M. Johnson, Wauwatosa, WI (US)

(73) Assignee: S. C. Johnson & Son, Inc., Racine, WI (US)

( * ) Notice: Under 35 U.S.C. 154(b), the term of this patent shall be extended for 0 days.

(21) Appl. No.: 09/170,686

(22) Filed: Oct. 13, 1998

(51) Int. Cl.[7] .................................................. B01D 46/00
(52) U.S. Cl. .......................... 55/309; 55/385.1; 55/490; 55/502; 55/507; 55/DIG. 24; 55/DIG. 35
(58) Field of Search .................. 55/385.1, 385.2, 55/385.6, 502, 507, DIG. 24, DIG. 31, DIG. 35, DIG. 44, 524, 490, 491, 486, 309; 261/DIG. 65; 156/291

(56) References Cited

U.S. PATENT DOCUMENTS

| | | |
|---|---|---|
| 3,458,130 | 7/1969 | Juhlin . |
| 3,971,877 * | 7/1976 | Lee ........................................ 55/491 |
| 4,340,402 | 7/1982 | Catron . |
| 4,347,912 * | 9/1982 | Flocke et al. .......................... 55/524 |
| 4,889,542 | 12/1989 | Hayes . |
| 5,008,489 * | 4/1991 | Weeks, Jr. et al. .................. 156/291 |
| 5,108,474 * | 4/1992 | Riedy et al. ............................ 55/502 |
| 5,114,448 * | 5/1992 | Bartilson ................................ 55/491 |
| 5,163,870 * | 11/1992 | Cooper ................................ 55/385.6 |
| 5,421,862 * | 6/1995 | Davis ..................................... 55/491 |
| 5,462,569 * | 10/1995 | Benjamin ............................ 55/385.6 |
| 5,490,336 * | 2/1996 | Smick et al. ........................ 55/385.1 |
| 5,525,136 * | 6/1996 | Rosen ..................................... 55/486 |
| 5,681,630 * | 10/1997 | Smick et al. ............................ 55/524 |
| 5,689,969 * | 11/1997 | Lowroy .................................. 55/490 |
| 5,776,218 * | 7/1998 | Enns ................................. 55/DIG. 35 |
| 5,827,340 * | 10/1998 | Fike .................................... 55/385.6 |
| 5,861,128 * | 1/1999 | Vick et al. ..................... 261/DIG. 65 |
| 5,912,369 * | 6/1999 | Reeves ................................ 55/385.6 |

FOREIGN PATENT DOCUMENTS

| | | |
|---|---|---|
| 0 867 216 A1 | 9/1998 | (EP) . |
| WO 98/10692 | 3/1998 | (WO) . |

OTHER PUBLICATIONS

Advertisment: *National Allergy Supply, Inc.*, 1997, p. 1.

* cited by examiner

Primary Examiner—David A. Simmons
Assistant Examiner—Minh-Chau T. Pham

(57) ABSTRACT

A filtering device (10,30,54,70) for use with a register (52,56,110) in a forced air climate control system (50) primarily includes a filter substrate (12,32) and an adhesive layer (14,34). The filter substrate (12,32) filters particulate matter from air flowing through it. The adhesive layer (14,34) is disposed in a discontinuous pattern on the filter substrate (12,32) to permit removable attachment of the filter substrate (12,32) to the register (52,56,110) while simultaneously allowing air to bypass the filter substrate (12,32) when the filter substrate (12,32) becomes substantially saturated with the particulate matter.

27 Claims, 4 Drawing Sheets

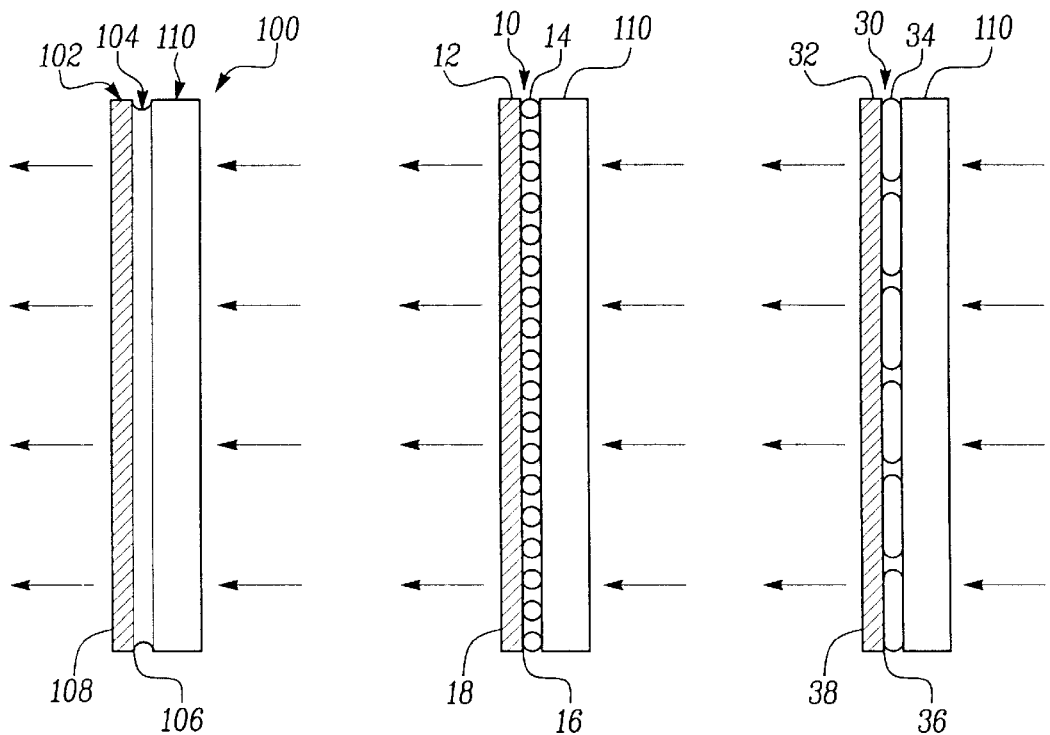
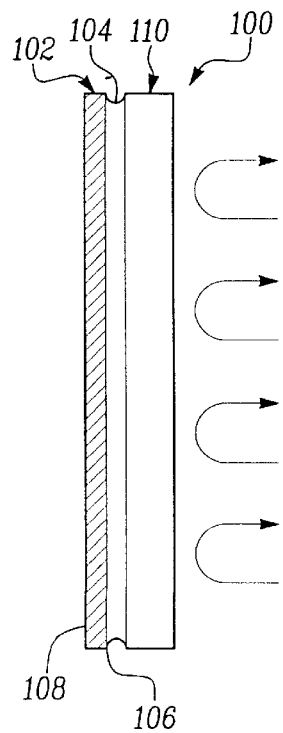
*Fig-11*
PRIOR ART
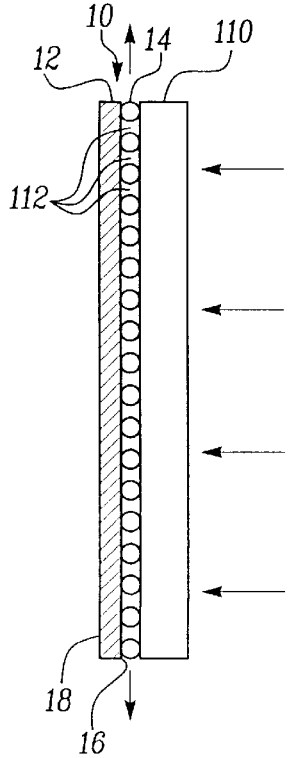
*Fig-12*
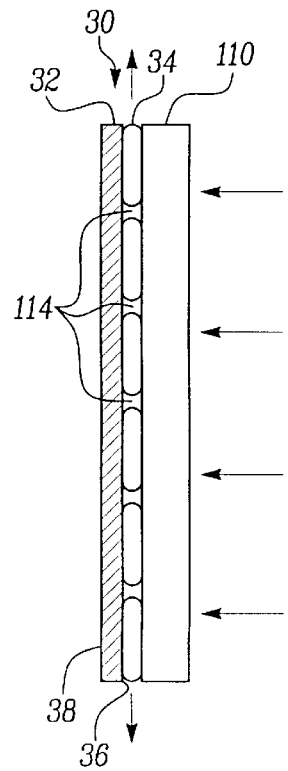
*Fig-13*

SELF-ADHESIVE AIR FILTER FOR FORCED AIR CLIMATE CONTROL SYSTEM

BACKGROUND OF THE INVENTION

1. Field of the Invention

The present invention relates generally to air filters and more particularly to a self-adhesive air filter for use in forced air climate control systems.

2. Background and Summary of the Invention

The use of air filters to remove particulate matter from an airflow is well known. Modern air filters are generally comprised of a filtering media and a support means to provide support to the filtering media. Typically, the filtering media is comprised of a substantially flexible fibrous material, either of natural and/or synthetic origin, that is capable of retaining particulate matter contained in an airflow passing through the filtering media. Typically, the support means is a frame or bracket that extends around the periphery of the filtering media.

With respect to modern climate control systems that employ the use of forced air, such as certain heating, ventilation, and air conditioning (HVAC) systems, there has been significant interest in the development of suitable air filters that can remove particulate matter from the airflow while simultaneously preventing damage to the climate control system. Conventional air filters are usually available only in pre-sized full frame styles which restrict their use to a relatively narrow range of possible register sizes. Recent air filtering techniques have included the direct mounting of the filtering media to the exterior surface of an air supply or air return register. However, this technique includes the inconvenience and cost of secondary attachment means.

U.S. Pat. No. 3,458,130 discloses that in lieu of a single removable large air filter disposed in the furnace adjacent the blower, a relatively small air filter fitting tightly on each of the individual cold air registers (i.e., air return registers) is employed. These small air filters are secured to the air return registers with a band of adhesive that extends along the entire periphery of the air filter, thus forming an air-tight seal about the air return register.

U.S. Pat. No. 4,340,402 discloses a dual air filter system comprising a releasably securable disposable secondary filter comprised of polypropylene secured to a disposable or permanent primary filter comprised of fiberglass. The dual air filter is intended for use with heaters and air conditioners.

U.S. Pat. No. 4,889,542 discloses a filter panel adhesively attached to the outside of a computer housing to cover the air intake grids used to draw air into the housing by a draft from a cooling fan in the housing. The filter is comprised of a porous permeable reticulated flexible polyester polymeric foam about ¼ inch thick with a continuous adhesive strip on the back side to removably attach the foam over the air intake opening.

A vent filtration kit marketed by National Allergy Supply, Inc. comprises polyester filters to remove dust coming out of ductwork (i.e., air supply registers). The filters fit over or under the air supply registers. The filters are secured to the supply registers with Velcro™ strips that are mounted to the exterior surfaces of the supply registers.

Although these filtering devices may, to a certain extent, reduce the amount of particulate matter in an airflow, they are also capable of causing damage to the climate control system, especially a forced air climate control system. For example, when the above-described filters, especially those mounted over an air supply register, become substantially saturated with particulate matter, the airflow through the filters may become blocked to the point where airflow ceases to pass through the filters. At that point a potentially dangerous situation may arise where air pressure is rapidly built up about the air supply register. Because the airflow can not escape through the filter, due primarily to the airtight seal formed about the air supply register with conventional air filters, the airflow is forced backed toward the furnace. This can lead to substantial damage to the climate control system.

Therefore, there exists a need for a filtering device that can be used with a register of a forced air climate control system, especially an air supply register, wherein the filtering device allows the airflow to bypass the filtering device when it becomes substantially saturated with particulate matter.

In accordance with one embodiment of the present invention, a filtering device for use with a register in a forced air climate control system comprises a filter substrate having a first major face and a second major face for filtering particulate matter from air flowing through the filter substrate, wherein the air flows in a direction ranging from substantially perpendicular to substantially oblique to the major faces. An adhesive layer is disposed in a discontinuous pattern on the second major face and is arranged thereon to permit removable attachment of the filter substrate to the register while simultaneously providing passageways parallel to the second major face for allowing air to escape from the edges of the filter substrate when the filter substrate has become substantially saturated with particulate matter.

BRIEF DESCRIPTION OF THE DRAWINGS

The present invention will become more fully understood from the detailed description and the accompanying drawings, wherein:

FIG. 8 is a cross-sectional view of a prior art filtering device, illustrating the airflow pattern when the filter substrate is substantially unsaturated with particulate matter;

FIG. 9 is a cross-sectional view of the filtering device depicted in FIG. 1, illustrating the airflow pattern when the filter substrate is substantially unsaturated with particulate matter;

FIG. 10 is a cross-sectional view of the filtering device depicted in FIG. 2, illustrating the airflow pattern when the filter substrate is substantially unsaturated with particulate matter;

FIG. 11 is a cross-sectional view of a prior art filtering device, illustrating the airflow pattern when the filter substrate is substantially saturated with particulate matter;

FIG. 12 is a cross-sectional view of the filtering device depicted in FIG. 1, illustrating the airflow pattern when the filter substrate is substantially saturated with particulate matter; and FIG. 13 is a cross-sectional view of the filtering device depicted in FIG. 2, illustrating the airflow pattern when the filter substrate is substantially saturated with particulate matter.

DETAILED DESCRIPTION OF THE PREFERRED EMBODIMENTS

Figure 1:
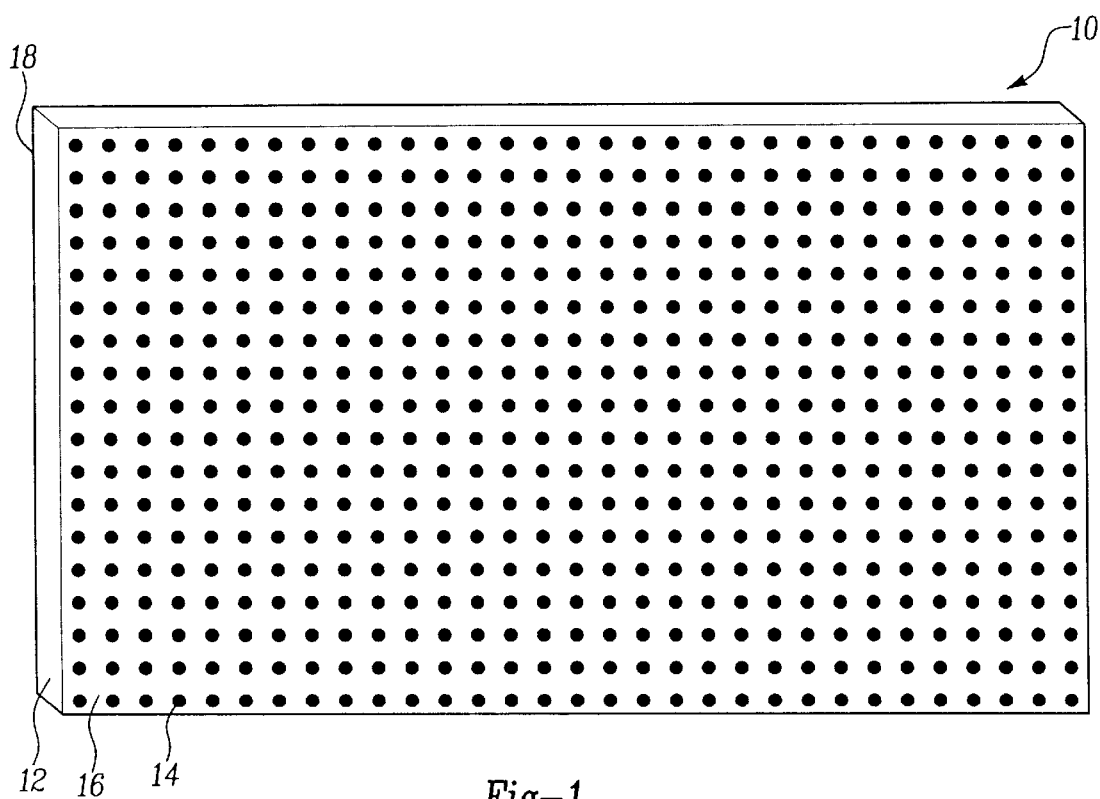
FIG. 1 is a perspective view of a filtering device, in accordance with one embodiment of the present invention.

With reference to FIG. 1, there is generally illustrated a filtering device 10, in accordance with one embodiment of the present invention. The filtering device 10 consists primarily of a filtering media or filter substrate 12 and an adhesive layer 14 disposed in a discontinuous pattern on a major face 16 of the filter substrate 12. Fragrancing and/or odor neutralizing may be an optional feature of the filter substrate 12 and/or the adhesive layer 14.

The filtering device 10 is intended primarily for use with the air supply and/or air return registers of a forced air climate control system. These registers can be located on either the floor, ceiling, or wall. The filtering device 10 is intended primarily to filter dust, pollen, mold, allergens, and any other particulate matter from the forced airflow. However, the skilled artisan will appreciate that the filtering device 10 of the present invention is capable of application to any type of mechanical system that requires an airflow to be filtered.

Although the filtering device 10 is shown as being substantially rectangular in configuration, it will be appreciated by the skilled artisan that any number of suitable configurations are possible, including squares, ovals, circles, and the like. Additionally, although the filtering device 10 is shown as being a discrete blank, it will be appreciated by the skilled artisan that the discrete blank may be cut, shaped, or otherwise formed from a continuous roll, sheet, or spool of material comprising the filtering device 10.

The filter substrate 12 may be comprised of woven and/or non-woven fibers, and may also be comprised of natural and/or synthetic fibers. Additionally, the filter substrate 12 may consist of one or more interconnected layers of the aforementioned fibers. Further, the fibers may hold an electrostatic charge so as to attract particulate matter contained in the airflow. By way of a non-limiting example, a preferred filter material is readily commercially available from 3M Corporation (St. Paul, Minn.) and is currently marketed under the tradename FILTRETE™. FILTRETE™ brand air filters are comprised primarily of electrostatically charged polypropylene fibers.

The adhesive layer 14 is preferably comprised of any number of suitable semi-permanent, pressure sensitive adhesives, such as those typically employed with various types of masking tapes and the like. The adhesive layer 14 may be applied to the filter substrate 12 by any number of conventional methods, including spraying, streaming, brushing, rubbing, rolling, and the like. The exact choice of adhesive is not thought to be critical, provided that the adhesive employed is capable of adhering to the filtering media and an air supply and/or an air return register under various temperature, humidity, and air pressure conditions. The adhesive should preferably be easy to clean and should not harm the registers or any surrounding surfaces.

The adhesive layer 14 is selectively applied to the major face 16 of the filter substrate 12 in order to provide sufficient adhesion to the register cover while minimally impacting the filtering properties of the substrate. As previously noted, the adhesive layer 14 is preferably applied in a discontinuous pattern on the major face 16 of the filter substrate 12. Preferably, the adhesive layer 14 extends from one transverse edge of the filter substrate 12 to the opposed transverse edge in order to properly adhere to the register. By way of a non-limiting example, the adhesive layer 14 preferably covers between about 12 to about 18 percent of the surface area of the major face 16 of the filter substrate 12. Because the filter substrate 12 could be used in either direction with respect to the direction of the airflow, the adhesive layer 14 could have just as easily been disposed on the other major face 18 of the filter substrate 12. It is, however, especially important that the adhesive layer 14 does not comprise a continuous band around the periphery of the filter substrate 12. In this view, the pattern is essentially a matrix of dots. This pattern is for illustrative purposes only, and is not meant to limit the scope of the present invention.

By applying the adhesive in a discontinuous pattern, it functions to removably fasten the filter substrate 12 at spaced apart locations around the periphery of a register rather than completely around. This provides the safety feature of allowing "blow by" in the case of a filter substrate 12 that has become clogged or substantially saturated with particulate matter due to not being changed for an extended period of time or after substantial short term loading. This feature helps to prevent damage to the climate control system. Additionally, the discontinuous adhesive pattern also minimizes the occlusion of the filter substrate 12 and, therefore, enhances filtering performance.

Figure 2:
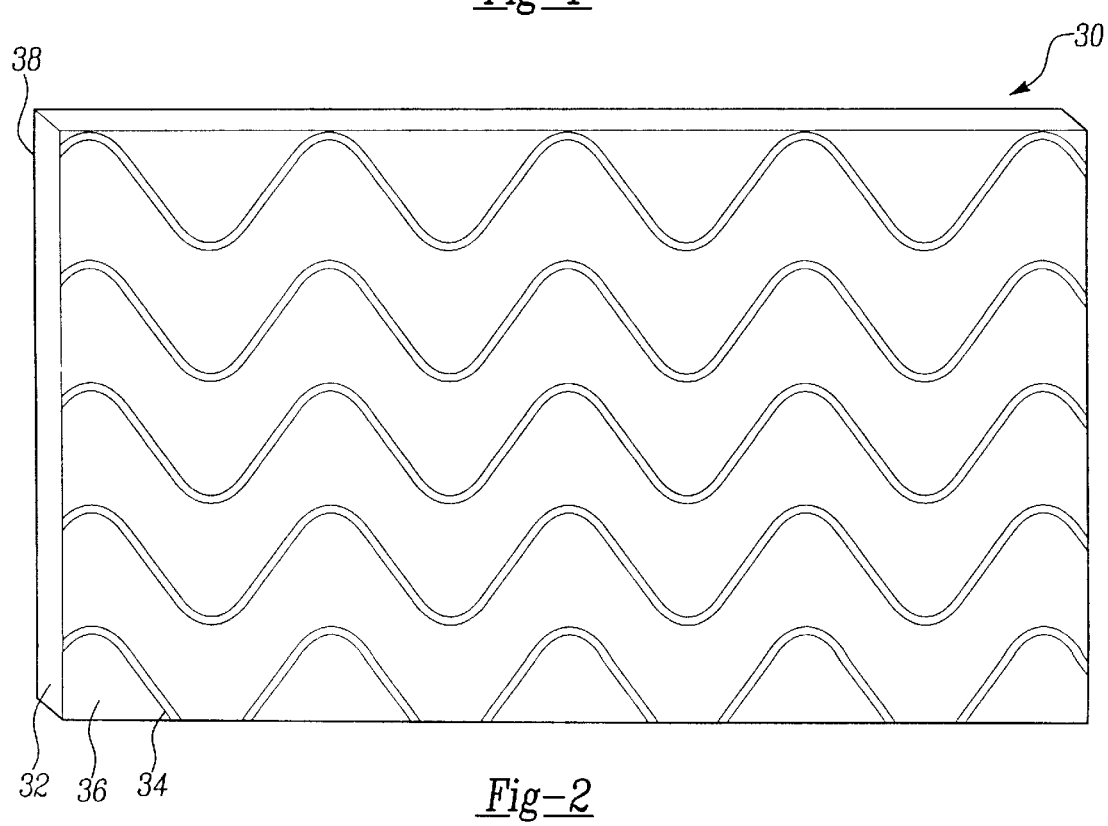
FIG. 2 is a perspective view of a filtering device, in accordance with an alternative embodiment of the present invention.

With reference to FIG. 2, there is shown a perspective view of a filtering device 30, in accordance with an alternative embodiment of the present invention. The filtering device 30 consists primarily of a filter substrate 32 and an adhesive layer 34 disposed in a discontinuous pattern on a major face 36 of the filter substrate 32. Preferably, the adhesive layer 34 extends from one transverse edge of the filter substrate 32 to the opposed transverse edge in order to properly adhere to the register. By way of a non-limiting example, the adhesive layer 34 preferably covers between about 12 and about 18 percent of the surface area of the major face 36 of the filter substrate 32. Because the filter substrate 32 could be used in either direction with respect to the direction of the airflow, the adhesive layer 34 could have just as easily been disposed on the other major face 38 of the filter substrate 32. The most significant difference between the alternative embodiment and the embodiment depicted in FIG. 1, is that the adhesive layer pattern consists of a series of parallel serpentine peaks and valleys; not unlike a series of sine curves. This pattern is for illustrative purposes only, and is not meant to limit the scope of the present invention. Again, it is especially important that the adhesive layer 34 does not comprise a continuous band around the periphery of the filter substrate 32.

Figure 3:
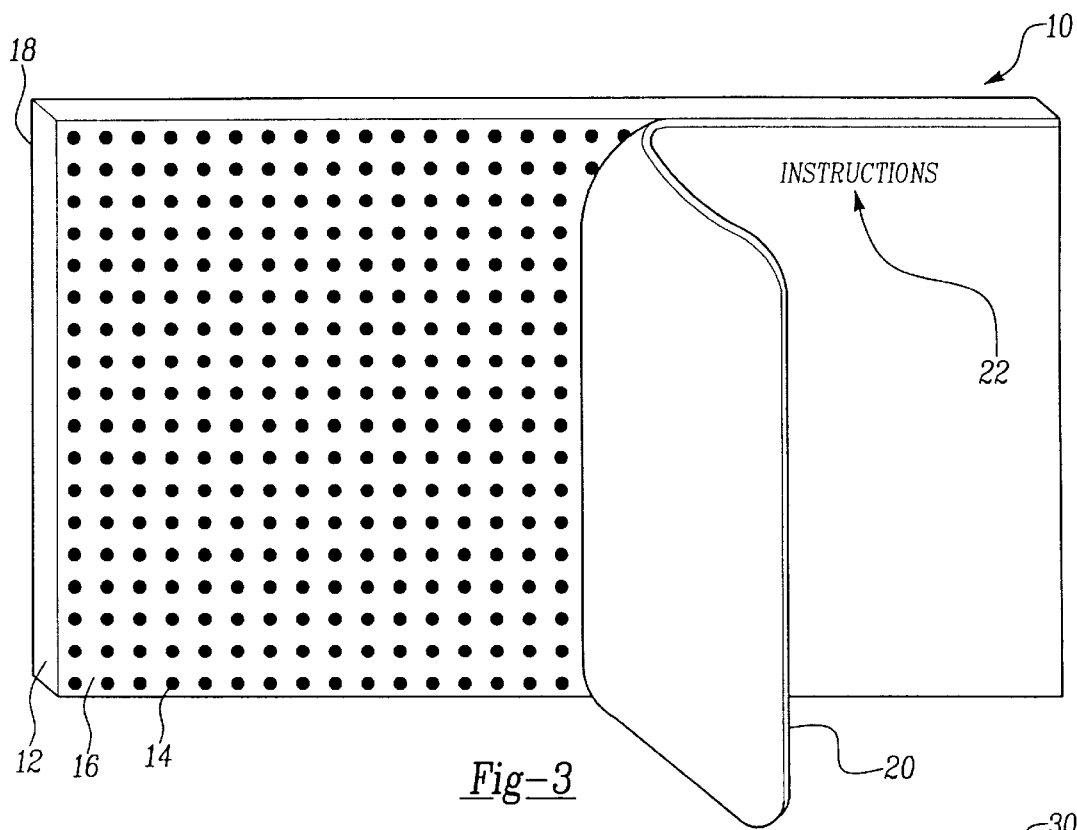
FIG. 3 is a perspective view of the filtering device depicted in FIG. 1, wherein the filtering device is provided with an optional protective covering.
Figure 4:
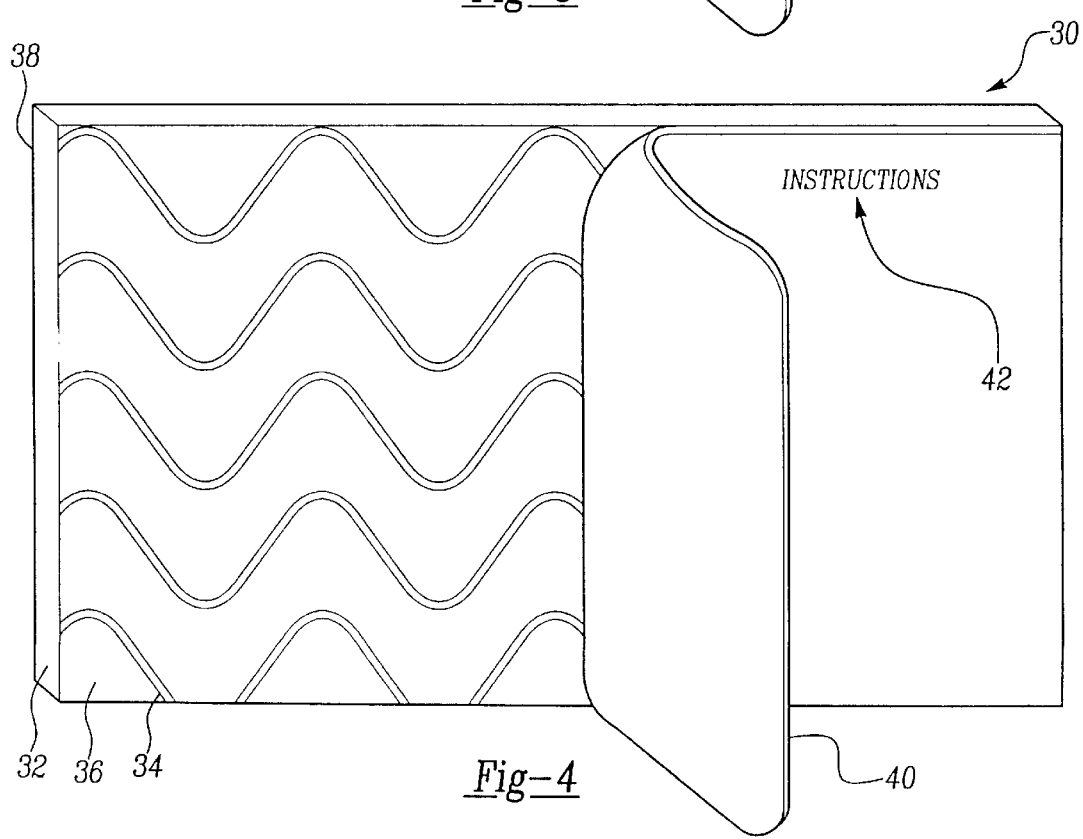
FIG. 4 is a perspective view of the filtering device depicted in FIG. 2, wherein the filtering device is provided with an optional protective covering.

With reference to FIGS. 3 and 4, the filtering devices 10 and 30, respectively, may optionally be provided with removable liner sheets or protective coverings 20 and 40, respectively, in order to protect the adhesive layers 14 and 34, respectively, until the time for deployment has arrived. In each case, the protective coverings 20 and 40 may be printed with indicia means 22 and 42, respectively. The indicia means 22 and 42 may comprise a grid or other graphics that function as a cutting guide and/or usage instructions. By allowing the consumer to cut the material to size, a much greater flexibility of use is gained by allowing the exact size and shape of the register to be matched as closely as possible.

Referring again to FIG. 3, once the consumer is ready to deploy the filtering device 10, the protective covering 20 is removed by simply peeling it off. The major face 16 of the filter substrate 12 containing the adhesive layer 14 is then pressed onto a register whereupon it will remain until removal. Thus, the filtering device 10 is said to be self-adhesive in that no additional attachment or mounting means is required. Although the present invention contemplates that the filtering device 10 will be adhered to the external surface of a register, it is also possible to adhere the filtering device 10 to the internal surface of a register.

Figure 5:
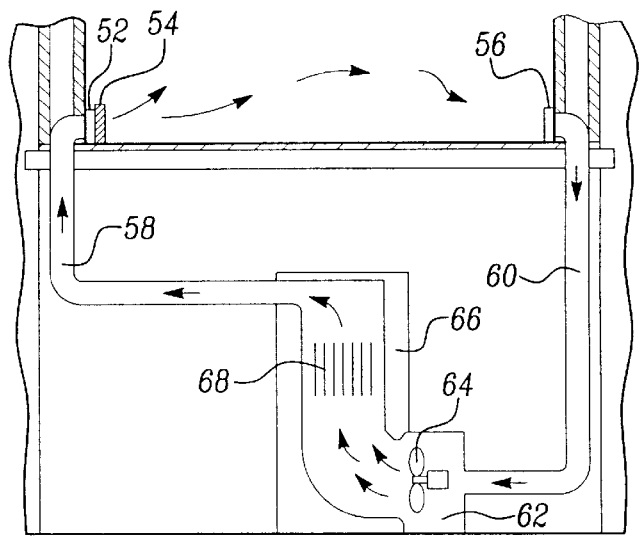
FIG. 5 is a partial cross-sectional view of a climate control system having a filtering device, in accordance with the general teachings of the present invention, removably fastened to an air supply register.

With reference to FIG. 5, there is shown a partial cross-sectional view of climate control system 50 having a filtering device, in accordance with the general teachings of the present invention, removably fastened to an air supply register. Shown are an air supply register 52, a filtering device 54 covering the external surface of the air supply register 52, an air return register 56, an air supply duct 58, an air return duct 60, an air return 62, a blower 64, a furnace 66, and a heat exchange unit 68. The direction of the airflow is indicated by the arrows. Thus, when the blower 64 generates an airflow, any particulate matter contained therein will be retained by the filtering device 54, instead of being dispersed throughout the structure or dwelling.

Figure 6:
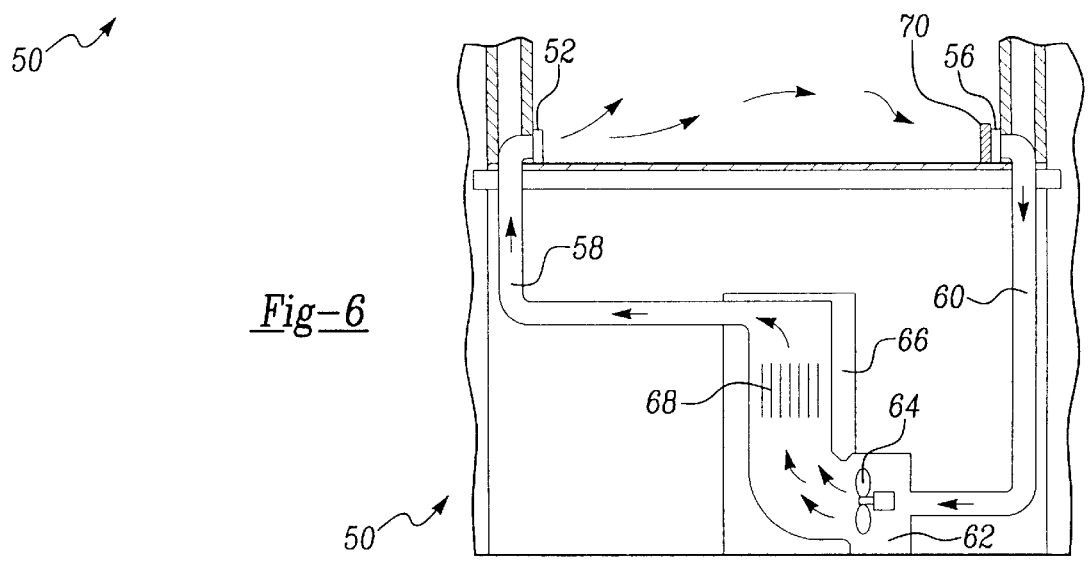
FIG. 6 is a partial cross-sectional view of a climate control system having a filtering device, in accordance with the general teachings of the present invention, removably fastened to an air return register.

With reference to FIG. 6, there is shown a partial cross-sectional view of climate control system 50 having a filtering device, in accordance with the general teachings of the present invention, removably fastened to an air return register. Shown are an air supply register 52, an air return register 56, a filtering device 70 covering the external surface of the air return register 56, an air supply duct 58, an air return duct 60, an air return 62, a blower 64, a furnace 66, and a heat exchange unit 68. The direction of the airflow is indicated by the arrows. Thus, when the blower 64 generates an airflow, any particulate matter contained therein will be retained by the filtering device 70, instead of being returned to the blower 64 to be re-dispersed throughout the structure or dwelling.

Figure 7:
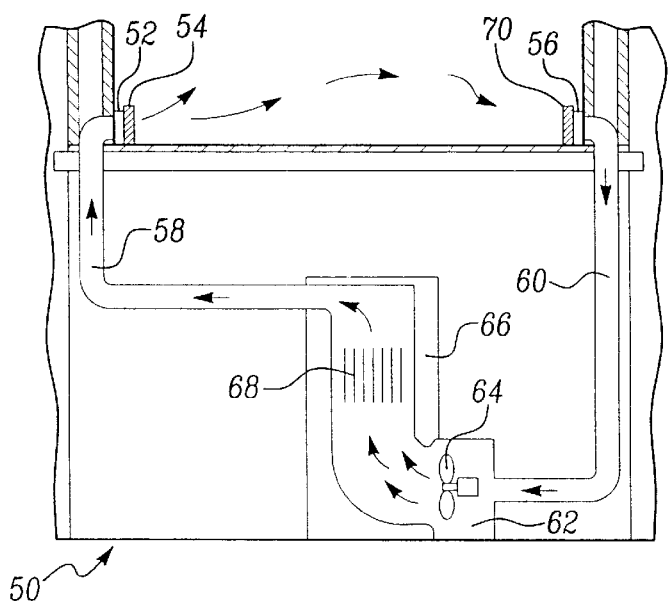
FIG. 7 is a partial cross-sectional view of a climate control system having a filtering device, in accordance with the general teachings of the present invention, removably fastened to both an air supply register and an air return register.

With reference to FIG. 7, there is shown a partial cross-sectional view of climate control system 50 having a filtering device, in accordance with the general teachings of the present invention, removably fastened to an air supply register and an air return register. Shown are an air supply register 52, a filtering device 54 covering the external surface of the air supply register 52, an air return register 56, a filtering device 70 covering the external surface of the air return register 56, an air supply duct 58, an air return duct 60, an air return 62, a blower 64, a furnace 66, and a heat exchange unit 68. The direction of the airflow is indicated by the arrows. Thus, when the blower 64 generates an airflow, any particulate matter contained therein will be retained by the filtering device 54, instead of being dispersed throughout the structure or dwelling. Additionally, if any particulate matter does escape past the filtering device 54 (e.g., during blow-by) or enters the air space by other means of egress (e.g., doors, windows, foot traffic), the particulate matter will be retained by the filtering device 70 instead of being returned to the blower 64 to be re-dispersed throughout the structure or dwelling.

In order to fully appreciate the blow-by feature of the present invention, reference is made to FIGS. 8–13.

With reference to FIG. 8, there is shown a cross-sectional view of a prior art filtering device 100, illustrating the airflow pattern when the filter substrate is substantially unsaturated with particulate matter. The filtering device 100 is comprised of a filter substrate 102, and a continuous band of an adhesive layer 104 disposed along the entire periphery of a major face 106 of the filter substrate 102. The other major face 108 does not contain any adhesive. The adhesive layer 104 is adhered to an air supply register 110. The airflow direction is indicated by the arrows. As can be seen, the airflow is relatively unobstructed when the filter substrate 102 is substantially unsaturated with particulate matter. The airflow direction is depicted as being substantially perpendicular to both major faces 106 and 108, respectively.

It should be noted that certain registers have directional vanes and cooperating louvers associated therewith. Typically, the directional vane may be manipulated in such a manner so as to cause the louvers to alter the airflow direction from substantially perpendicular to substantially oblique to the major faces of the filter substrate. For example, vertically oriented louvers may be pivoted about their longitudinal central axes, whereas horizontally oriented louvers may be pivoted about their latitudinal central axes. However, the skilled artisan will recognize that the filtering device of the present invention will function whether the airflow direction ranges from substantially perpendicular to substantially oblique to the major faces of the filter substrate.

With reference to FIG. 9, there is shown a cross-sectional view of the filtering device 10 depicted in FIG. 1, illustrating the airflow pattern when the filter substrate 12 is substantially unsaturated with particulate matter. As previously noted, the filtering device 10 is comprised of a filter substrate 12, and a discontinuous layer of an adhesive layer 14 disposed on a major face 16 of the filter substrate 12. The adhesive layer 14 is adhered to the air supply register 110. The airflow direction is indicated by the arrows. As can be seen, the airflow is relatively unobstructed when the filter substrate 12 is substantially unsaturated with particulate matter. The airflow direction is depicted as being substantially perpendicular to both major faces 16 and 18, respectively.

With reference to FIG. 10, there is shown a cross-sectional view of the filtering device 30 depicted in FIG. 2, illustrating the airflow pattern when the filter substrate 32 is substantially unsaturated with particulate matter. As previously noted, the filtering device 30 is comprised of a filter substrate 32, and a discontinuous layer of an adhesive layer 34 disposed on a major face 36 of the filter substrate 32. The adhesive layer 34 is adhered to the air supply register 110. The airflow direction is indicated by the arrows. As can be seen, the airflow is relatively unobstructed when the filter substrate 32 is substantially unsaturated with particulate matter. The airflow direction is depicted as being substantially perpendicular to both major faces 36 and 38, respectively.

With reference to FIG. 11, there is shown a cross-sectional view of the prior art filtering device 100, illustrating the airflow pattern when the filter substrate is substantially saturated with particulate matter. The airflow direction is indicated by the arrows. In this instance, because the adhesive layer 104 extends completely around the periphery of the filter substrate 102, it essentially forms an air-tight seal about the air supply register 110. Thus, the airflow can not pass through the filter substrate 102, nor can it bypass the filter substrate 102 by flowing parallel to major face 106. Therefore, the airflow is eventually forced back toward the furnace, potentially causing damage to the climate control system.

With reference to FIG. 12, there is shown a cross-sectional view of the filtering device depicted in FIG. 1, illustrating the airflow pattern when the filter substrate is substantially saturated with particulate matter. The airflow direction is indicated by the arrows. However, as previously noted, the filtering device of the present invention will function whether the airflow direction ranges from substantially perpendicular to substantially oblique to the major faces of the filter substrate. In this instance, because the adhesive layer 14 does not extend completely around the periphery of the filter substrate 12, it does not form an air-tight seal about the air supply register 110. The areas along the periphery of the filter substrate 12 that are free of adhesive provide a plurality of passageways 112 to allow air to escape in the event the filter substrate 12 becomes clogged or substantially saturated with particulate matter. Thus, while the airflow can not pass through the filter substrate 12, it can easily bypass the filter substrate 12 by flowing through the passageways parallel to major face 16 along the periphery of the filter substrate 12. Therefore, potential damage to the climate control system is avoided.

With reference to FIG. 13, there is shown a cross-sectional view of the filtering device depicted in FIG. 2, illustrating the airflow pattern when the filter substrate is substantially saturated with particulate matter. The airflow direction is indicated by the arrows. However, as previously noted, the filtering device of the present invention will function whether the airflow direction ranges from substantially perpendicular to substantially oblique to the major faces of the filter substrate. Again, because the adhesive layer 34 does not extend completely around the periphery of the filter substrate 32, it does not form an air-tight seal about the air supply register 110. The areas along the periphery of the filter substrate 32 that are free of adhesive provide a plurality of passageways 114 to allow air to escape in the event the filter substrate 32 becomes clogged or substantially saturated with particulate matter. Thus, while the airflow can not pass through the filter substrate 32, it can easily bypass the filter substrate 32 by flowing through the passageways parallel to major face 36 along the periphery of the filter substrate 32. Therefore, potential damage to the climate control system is avoided.

The thickness of the adhesive layer of the present invention should not be so thick that the filter substrate is situated too far from the register surface after being adhered thereto, thus allowing a substantial portion of the airflow to unintentionally flow through the passageways even though the filter substrate is substantially unsaturated with particulate matter. If this were to occur, the filtering performance of the filtering device would be unnecessarily diminished. Conversely, the adhesive layer of the present invention should be thick enough so that the passageways become rapidly and fully functional when a sufficient amount of air pressure is built up about the register when the filter substrate becomes substantially saturated with particulate matter.

The foregoing description is considered illustrative only of the principles of the invention. Furthermore, because numerous modifications and changes will readily occur to those skilled in the art, it is not desired to limit the invention to the exact construction and process shown as described above. Accordingly, all suitable modifications and equivalents that may be resorted to that fall within the scope of the invention as defined by the claims that follow.

What is claimed is:

1. A filtering device for use with a register in a forced air climate control system, comprising:
   (a) a filter substrate, having a first major face and a second major face, for filtering particulate matter from air flowing through the filter substrate; and
   (b) an adhesive layer disposed in a discontinuous pattern on the second major face and arranged to permit removable attachment of the filter substrate to the register while simultaneously providing passageways parallel to the second major face for allowing air to bypass the filter substrate when the filter substrate has become substantially saturated with the particulate matter.

2. The filtering device of claim 1, wherein the discontinuous pattern of the adhesive layer defines a matrix of dots.

3. The filtering device of claim 1, wherein the discontinuous pattern of the adhesive layer defines a plurality of parallel serpentine peaks and valleys.

4. The filtering device of claim 1, wherein the discontinuous pattern of the adhesive layer extends from at least one transverse edge to the opposed transverse edge.

5. The filtering device of claim 1, wherein the adhesive layer covers between about 12 to about 18 percent of the surface area of the second major face of the filter substrate.

6. The filtering device of claim 1, further comprising a removable protective covering, the protective covering being disposed on the adhesive layer, the removal of the protective covering exposing the adhesive layer so as to permit the filtering device to be removably fastened to the register.

7. The filtering device of claim 6, wherein the protective covering includes indicia means on at least one surface.

8. The filtering device of claim 1, wherein the filter substrate is selected from the group consisting of woven fibers, non-woven fibers, and combinations thereof.

9. The filtering device of claim 1, wherein the filter substrate is selected from the group consisting of natural fibers, synthetic fibers, and combinations thereof.

10. The filtering device of claim 1, wherein the filter substrate includes polypropylene fibers.

11. The filtering device of claim 1, wherein the filter substrate is electrostatically charged.

12. The filtering device of claim 1, wherein the filter substrate has a peripheral configuration substantially conforming to the peripheral configuration of the register.

13. The filtering device of claim 1, wherein the filter substrate further includes substances selected from the group consisting of fragrances, odor neutralizers, and combinations thereof.

14. The filtering device of claim 1, wherein the adhesive further includes substances selected from the group consisting of fragrances, odor neutralizers, and combinations thereof.

15. The filtering device of claim 1, wherein the adhesive is a pressure sensitive adhesive.

16. The filtering device of claim 1, wherein the particulate matter is an allergen.

17. The filtering device of claim 1, wherein the filtering device is removably fastened to an exterior surface of the register.

18. The filtering device of claim 1, wherein the filtering device is removably fastened to an interior surface of the register.

19. The filtering device of claim 1, wherein the register is selected from the group consisting of air supply registers, air return registers, and combinations thereof.

20. The filtering device of claim 1, wherein the adhesive layer has a thickness sufficient to allow air to flow though the passageways when the filter substrate has become substantially saturated with particulate matter.

21. A filter comprising:
   filter means for filtering particles from a flow of air through a register;

means for adhering the filtering means to the air register; and bypass means for allowing the flow of air to bypass the filtering means when the filtering means becomes substantially saturated with particles.

22. The filter of claim 21, wherein the filtering means comprises a filter substrate and the adhering means and bypass means together comprise a discontinuous pattern of adhesive applied to at least one side of the filter substrate.

23. The filter of claim 22, wherein the discontinuous pattern comprises a plurality of dots of adhesive.

24. The filter of claim 22, wherein the discontinuous pattern comprises a plurality of lines of adhesive.

25. The filter of claim 24, wherein the lines of adhesive are parallel.

26. The filter of claim 24, wherein the lines of adhesive are curved.

27. The filter of claim 22, wherein the adhesive is applied to between about 12 to about 18 percent of the surface area of the at least one side of the filter substrate.

* * * * *